March 31, 1970 IWAO KAWAKAMI 3,504,090
1-HYDROXYETHYL-4,5,-DIPHENYLIMIDAZOLE ANTI-PHLOGISTIC
AND ANTI-HISTAMIC COMPOSITION
Filed Dec. 29, 1966 7 Sheets-Sheet 1

*INVENTOR.*
IWAO KAWAKAMI
BY
*AGENT*

INVENTOR.
IWAO KAWAKAMI
BY
AGENT

FIG. 10

United States Patent Office 3,504,090
Patented Mar. 31, 1970

3,504,090
1 - HYDROXYETHYL - 4,5 - DIPHENYLIMID-
AZOLE ANTI - PHLOGISTIC AND ANTI-
HISTAMINIC COMPOSITION
Iwao Kawakami, 609 Kugayama Heim, 492–7 2-chome,
Kugayama, Suginami-ku, Tokyo, Japan
Continuation-in-part of applications Ser. No. 362,910,
Apr. 27, 1964, and Ser. No. 410,043, Oct. 20, 1964.
This application Dec. 29, 1966, Ser. No. 605,813
Int. Cl. A61k 5/00, 27/00
U.S. Cl. 424—273                        3 Claims

ABSTRACT OF THE DISCLOSURE

The addition of 1-hydroxyethyl-4,5-diphenylimidazole to cosmetics prevents or reduces the possibility of skin irritations or allergic reactions to cosmetic components. The compound has been found to have anti-phlogistic and anti-histaminic properties as well as the property of causing alternate dilating and contracting of peripheral blood vessels decreasing in intensity until normal pressure conditions appear.

This application is a continuation-in-part of my prior application S.N. 362,910, filed Apr. 27, 1964, now abandoned, and of my prior application No. 410,043, filed Oct. 20, 1964, now abandoned, which is a division of my prior application No. 242,717, filed Dec. 6, 1962, now Patent No. 3,258,466, issued June 28, 1966.

This invention relates to cosmetics containing 4,5-diphenylimidazole and/or 1-hydroxyethyl-4,5-diphenylimidazole. The new compound 1-hydroxyethyl-4,5-diphenylimidazole is described and claimed in my Patent No. 3,258,466 supra.

Experiments have shown that 4,5-diphenylimidazole, hereinafter referred to as (I), and 1-hydroxyethyl-4,5-diphenylimidazole, hereinafter referred to as (II), have the property of preventing or alleviating allergic reactions. Both are seen to have anti-phlogistic properties, and (II) seems to have anti-histaminic properties as well as the property of causing alternate dilating and contracting of peripheral blood vessels decreasing in intensity until normal pressure conditions appear.

An object of this invention is the preparation of a cosmetic substance or ointment containing the novel compound herein described.

Another object of this invention is the provision of a dentifrice in the form of a tooth paste, soft tooth paste and/or tooth powder which will cause no irritation or chapping within the mouth or damage to the oral mucous membrane.

A further object of this invention is the provision of a dentifrice having anti-phlogistic properties to prevent allergic reaction in the oral mucous membrane to certain basic materials in conventional dentifrices.

Another object of this invention is the provision of a dentifrice having the property of inducing dilation of the peripheral blood vessels and therefore improves the circulation of blood in the mouth to keep the teeth in a healthy condition.

A still further object of this invention is the provision of a dentifrice which causes no harmful reactions even after prolonged use.

The above and other objects will be apparent from a consideration of the accompanying drawings taken with the following specification, which together form a complete disclosure of my invention.

In the drawings.

The tracing in FIG. 6 represents a kymograph tracing showing the effect on a section of marmot's intestine when commercially available tooth paste is added to a bath, and thereafter the addition of a histamine.

The synthesis of (I) and (II) has been fully described in my Patent No. 3,258,466 supra, and need not be mentioned here.

Many cosmetics or dermatological preparations sold on the market today often contain substances which cause skin irritation or injury to some persons, especially those with unusuallly tender skins. Cosmetics which have caused injury or irritation to such persons, who are usually diathetic, have been applied to the skin of persons who have apparently recovered completely from allergic skin reactions. In most cases this caused a new eruption or other evidence of the allergic skin reaction, which seems to confirm the fact that skin irritations by cosmetics can be produced experimentally. Dermatologists have stated that skin injury caused by cosmetic products are a type of contact dermatitis. This is believed now not to be entirely true since the reactions are not the result of a single causative factor. Some of this contact dermatitis is rather difficult to treat at present. It should thus be quite difficult to manufacture irritation free cosmetics if the irritation is caused by cosmetics and the principal lesion is contact dermatitis. Recently, a group of dermatologists has concluded that the contact dermatitis has little relation to free histamine. Therefore, the addition of antihistamines to cosmetics has had little or no effect on skin sensitive persons. This has now been confirmed by research.

The addition of substances to cosmetics should enable them to act as though containing an antihistamine. It should further render them stable or resistant to changes in quality. When antihistamine drugs of the salt type, such as the hydrochloric salts, are added to cosmetics, coloring is likely to take place. Consequently, they are generally omitted. Further the addition of substances to cosmetics should not render them likely to cause contact dermatitis. The conditions above noted are important, and a great amount of research has been carried out in order to carry out such objects and conditions. A new chemical compound, 1-hydroxyethyl-4,5-diphenylimidazole, known herein as (II), has been found to be highly satisfactory. It shows a moderate antihistamine effect on an animal experiment, wherein the living intestine of a guinea pig was shrunk by 1 ml. of a 1/100% water solution of histamine. The shrunk intestine was treated with 1 cc. of a 0.5% water solution of (II) and was found to relax and become longer. When applied as a treatment for skin ailments, an ointment was prepared from hydrophilic petroleum jelly base containing 0.5% (II). In acute skin ailments, which are the result of free histamine etc., the treatment was effective in more than 90% of the trials. In chronic skin ailments when the effect of free histamine is not clearly apparent, the treatment is effective in 60% of the cases.

Figure 1:
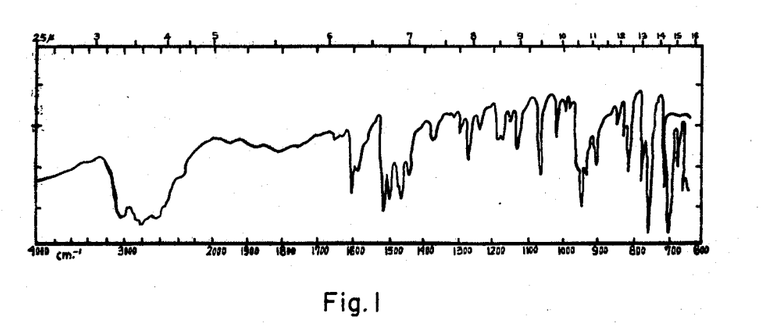
FIG. 1 is a graph showing the absorption in the infrared spectrum of 4,5-diphenylimidazole.
Figure 2:
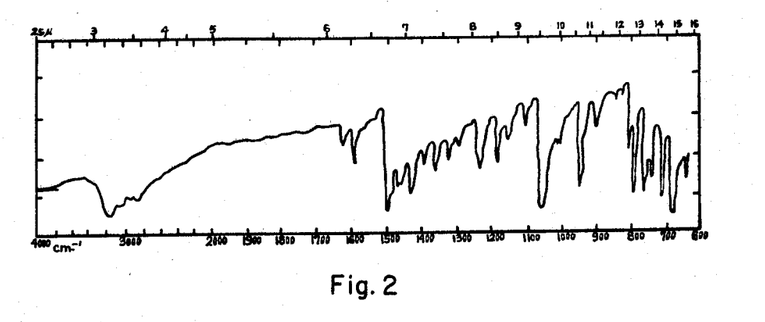
FIG. 2 is a graph showing the absorption in the infrared spectrum of 1-hydroxyethyl-4,5-diphenylimidazole.
Figure 3A:
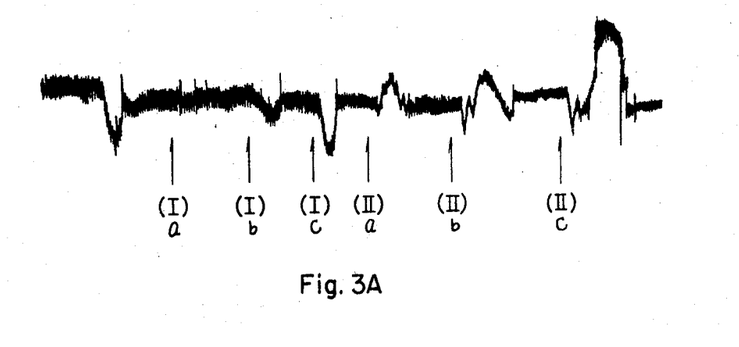
FIGS. 3A and 3B are graphs from photographs of a kymographic chart taken as later to be described.
Figure 3B:
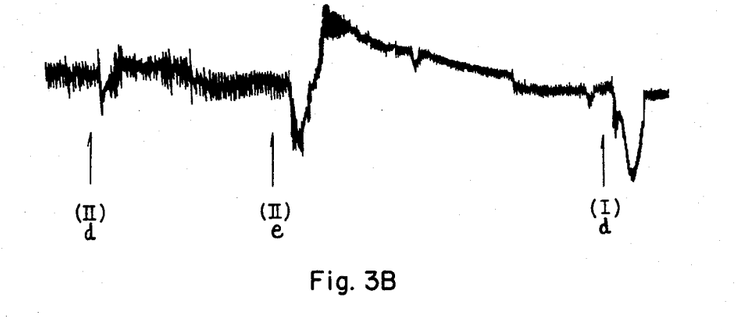
Figure 4:
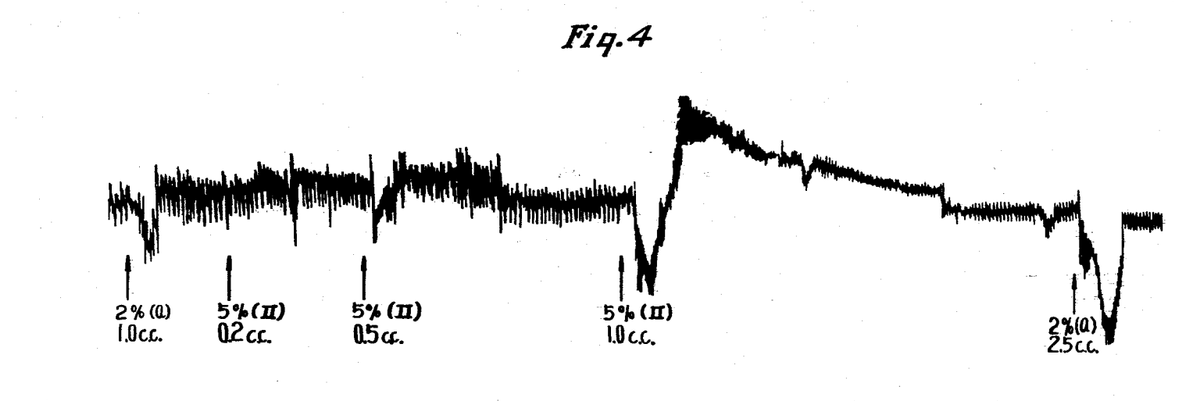
FIG. 4 and 5 are drawings made from a kymographic chart as in FIGS. 3A and 3B, showing the results with a control substance (a) and the results with different noted dosages and concentrations of the product (II) as later described.
Figure 5:
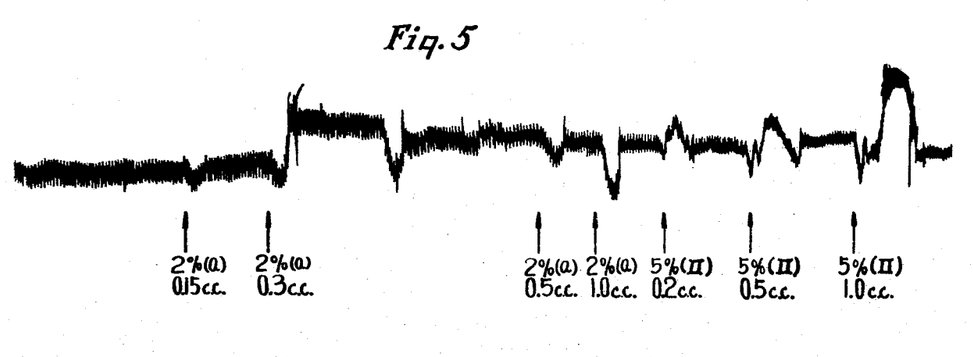

(II) has the remarkable effects as shown in FIGS. 3A and 3B. After injecting 1 cc. of a 5% water solution into the femoral vein of a mature dog, the total pressure in the jugular vein was measured with a mercury manometer. A drop in pressure is noted immediately, followed by a sharp rise. This is followed by a period of fluctuating reductions and rises in pressure of decreasing intensity until, after a few moments, normal steady pressure is noted. The graphs in FIGS. 4 and 5 are made from a kymograph record of these tests. As a control, 0.15 cc. of a 2% water solution of 4,5-diphenylimidazole (I) was injected as above. The result is shown as (a) in both FIGS. 4 and 5 and references 1 cc., 2.5 cc., of a 2% solution in FIG. 5 and in each case is a pressure drop only. The record shows at other points, denoted (II), the effect of various dosages and various concentrations of (II), 0.2, 0.5 and 1.0 cc. of (II) in each figure.

The above noted fluctuations of pressure can be referred to as phenomena of the peripheral blood vessels, when exposed to the substances referred to as used in cosmetics or medicated ointments. The reduction in pressure corresponds to a dilating of the peripheral blood vessels and the rise in pressure corresponds to a contraction of the peripheral blood vessels. Thus, when a preparation containing 1-hydroxyethyl-4,5-diphenylimidazole is applied, there is a period of dilation and contraction of the peripheral blood vessels decreasing in intensity until normal pressure is attained. The living body does not either constantly dilate or contract the blood vessels. Therefore, if they are dilated excessively, automatically by reflex action there is a contracting, seeking to attain the condition generally considered normal. Therefore, it is clear that the application of (II) should be such that the skin and the peripheral blood vessels therein will retain the normal status. In the above experiment, therein water solution of (II) was injected, the results are the same as those observed when a salve containing (II) is applied to the skin. Moreover, it has been confirmed that where cosmetics have caused injury or irritation, when such irritation has been cured, and an ointment containing (II) has been applied to the skin of allergic persons, little or no irritation was experienced. In experiments using 0.02% to 1.5% (II), it was confirmed that the substance (II) may be the crude preparation, before purification. Less than 0.02% seems to be relatively ineffective, while more than 1.5% may cause improper results.

In the following examples, representative of experimental batches of substances, the proportions are by weight, and show various preparations using (II).

I. COLD CREAM

| | Percent |
|---|---|
| Beeswax | 8.0 |
| Solid paraffin | 5.0 |
| Petroleum jelly | 15.0 |
| Fluid paraffin | 40.0 |
| Emulsifying agent | 6.0 |
| (II) | 0.08 |
| Perfume | 1.0 |
| Distilled water | 24.92 |

To this mixture a suitable amount of antiseptic substance may be added, if desired. To prepare; (1) mix beeswax, solid paraffin, petroleum jelly and fluid paraffin and heat the mixture and hold at 70° C.; (2) heat the distilled water to 70° C.; (3) mix (II), perfume and emulsifying agent and add to the batch of step (1); (4) pour the batches of steps (2), (3) together and mix in an emulsion mixer; (5) cool the batch of step (4) by stirring and pour into molds or containers to solidify.

II. VANISHING CREAM

| | Percent |
|---|---|
| Stearic acid | 15.0 |
| Glycerin monosterate | 5.0 |
| Cetyl alcohol | 4.0 |
| Emulsifying agent | 5.0 |
| (II) | 0.03 |
| Perfume | 1.0 |
| Propylene glycol | 15.0 |
| Potassium hydroxide | 0.2 |
| Distilled water | 54.77 |

To the above, suitable antiseptic substances may be added if desired. To prepare: (1) mix (II), emulsifying agent and perfume also half the propylene glycol and heat to dissolve; (2) mix distilled water, half the propylene glycol and potassium hydroxide and heat to 70° C.; (3) mix stearic acid, glycerin monosterate and cetyl alcohol and heat to melt and hold at 70° C.; (4) pour the batches of steps (1) and (3) together and mix thoroughly; (5) combine the batches of steps (2) and (4) and mix in an emulsion mixer; (6) cool the mixture and stir until it becomes creamy.

III. FACE MILK LOTION

| | Percent |
|---|---|
| Fluid paraffin | 10.0 |
| Stearic acid | 2.0 |
| Emulsifying agent | 4.0 |
| Alcohol | 5.0 |
| (II) | 0.1 |
| Perfume | 1.0 |
| Distilled water | 77.9 |

A suitable amount of antiseptic substance may be added to the above, if desired. To prepare; (1) mix (II), perfume, emulsifying agent, stearic acid and fluid paraffin and heat to melt; hold at 65° C.; (2) mix distilled water and alcohol and heat to 65° C. and pour into batch of step (1) while stirring; (3) mix in an emulsifying mixer; (4) cool, while stirring, to 30° C.

IV. FACE LOTION

| | Percent |
|---|---|
| Carbowax (1500) | 5.0 |
| Propylene glycol | 10.0 |
| Alcohol | 15.0 |
| (II) | 0.04 |
| Perfume | 0.2 |
| Emulsifying agent | 1.0 |
| Distilled water | 68.76 |

A suitable amount of a harmless dye and an antiseptic agent may be added, if desired. To prepare: (1) mix perfume, (II), emulsifying agent and half the alcohol and melt; (2) mix all other ingredients and add to the batch of step (1) and emulsify.

The products of Examples I to IV and similar products without (II) were tested on 10 skin sensitive women who at the time were free of any allergy reactions. For comparison, half the face was treated with the product containing (II) and the other half with the similar products without (II). The results are shown in the following table:

| Cosmetics | With (II) | Without (II) |
|---|---|---|
| Cold cream | 1 | 10 |
| Vanishing cream | 0 | 2 |
| Face milk lotion | 0 | 10 |
| Face lotion | 0 | 5 |

The noted skin irritations included itchiness and eruptions.

Tyrode's solution, named for its inventor, hereinbefore mentioned, has the following composition per litre:

| | G. |
|---|---|
| Potassium chloride | 0.2 |
| Calcium chloride (crystal) | 0.2 |
| Magnesium chloride | 0.1 |
| Sodium bicarbonate | 1.0 |
| Sodium chloride | 8.0 |
| Disodium hydrogenphosphate | 0.05 |
| Glucose | 1.0 |
| Distilled water | q.s. |

In an experiment with the excised living intestine of a guinea pig, which had been shrunk beforehand by the application of 1/100% histamine solution, it was shown that the possibility of reducing skin irritation is increased percentage-wise when the new cosmetics were used. They were applied to patients who had recovered from allergic skin reactions. In these cases, an emulsifying agent, as a polyoxyethylene lauryl alcohol ether, was added to the cosmetics instead of using antihistamine drugs. The addition of such antihistamine drugs as Benadryl or such preparations as corticosteroid hormones does not effect a reduction of the skin irritation or contact dermatitis, but the new cosmetics containing a polyoxyethylene lauryl alcohol ether did show a weak activity reaction or beneficial results on the contact dermatitis.

The compounds (I), 4,5-diphenylimidazole, and (II), 1-hydroxyethyl-4,5-diphenylimidazole, have been found to be beneficial when employed as dentifrices as mentioned herein.

It has been determined that some commercially available dentifrices cause a reaction in the mucous membranes of the oral cavity after prolonged use. Animal tests confirm that these reactions and undesirable effects result from the irritating action of certain pharmacologically undesirable ingredients in the dentifrices used. The use of the dentifrice of this invention has eliminated or checked the undesirable effects on the mucous membranes of the oral cavity. In the test according to FIG. 6, when a section of marmot's intestine placed in a Tyrode's solution (point A), a spasm or contraction is noted upon the addition of 1 gm. of a commercially available tooth paste diluted with 2 cc. of Tyrode's solution. Then a strong normal contraction was indicated at point H when 1 cc. of 0.01% histamine solution was added. The contraction at point A proves that the tooth paste had caused an irritating action.

The graphs of FIGS. 6 to 10 show the relaxation and contraction of a small section of marmot's intestine placed in a bath of about 200 cc. of a nourishing liquid for living tissue, subsequently herein defined and hereinafter known as Tyrode's solution. The solution is brought to a temperature of 37 to 38° C. and commercially available tooth paste was added and then the tooth paste of this invention was added, each being dissolved in a small quantity of the Tyrode's solution, and thereafter, a solution capable of giving a histamine reaction was added. A section of marmot's intestine, as above, may be kept alive for 3 to 4 hours at a normal biological condition when it is placed in Tyrode's solution at a temperature of 37 to 38° C.

Figure 6:
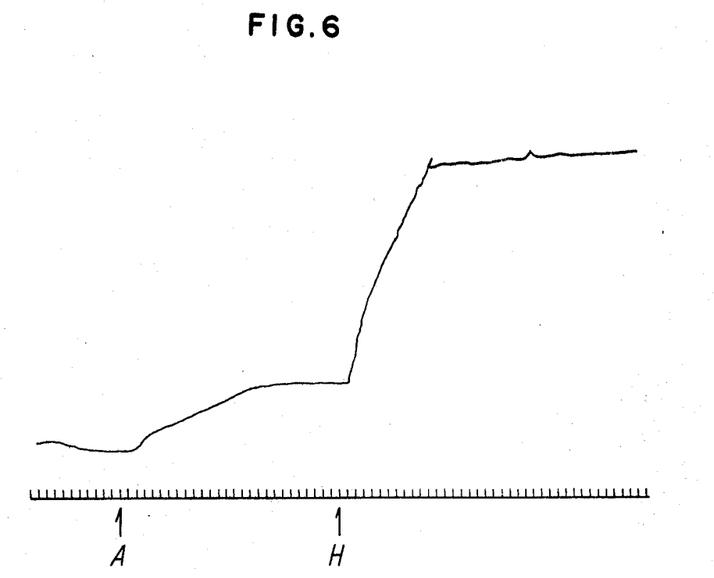
Figure 7:
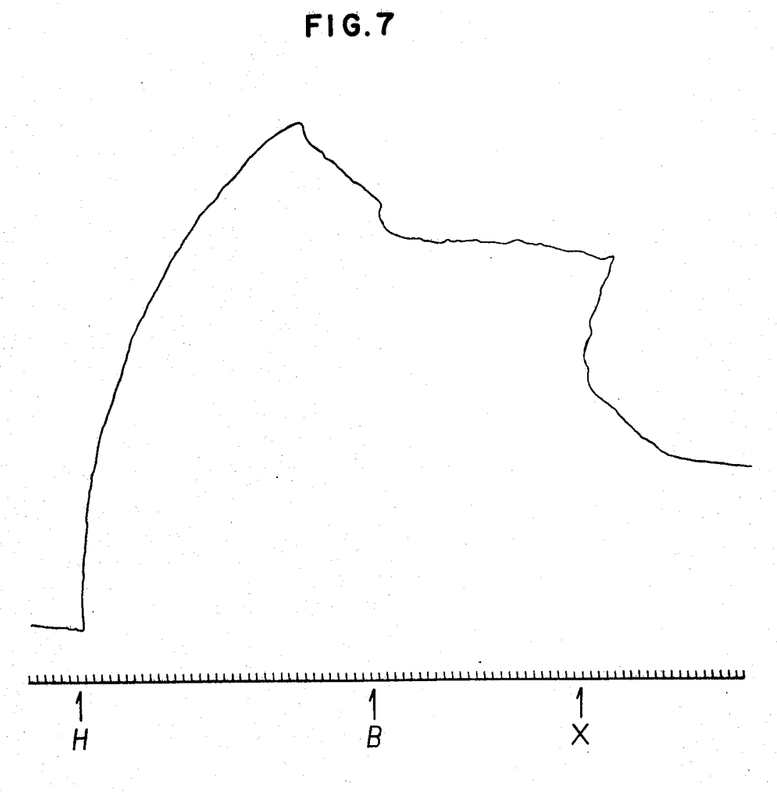
FIG. 7 is a similar tracing showing the effect of adding a histaminic solution to the bath and thereafter adding commercially available tooth paste and finally adding 4,5-diphenylimidazole.

The graph in FIG. 7 represents a test in which the normal contraction of the intestine section is indicated when 1 cc. of a 0.01% histamine solution was added, point H, then upon the addition of 0.5 gm. of commercially available tooth paste, as used in the test of FIG. 6, diluted with 1 cc. of Tyrode's solution, point B, no relaxation was indicated. The addition of 2 cc. of 0.1% solution of (I) (point X) shows a marked relaxation. It was noted that the contracted intestine section extended about half its former size. The fact that the other half remained still relaxed was due to the influence of the irritating action of the tooth paste added at point B. This shows that the tooth paste used at point B has an irritating effect.

Figure 8:
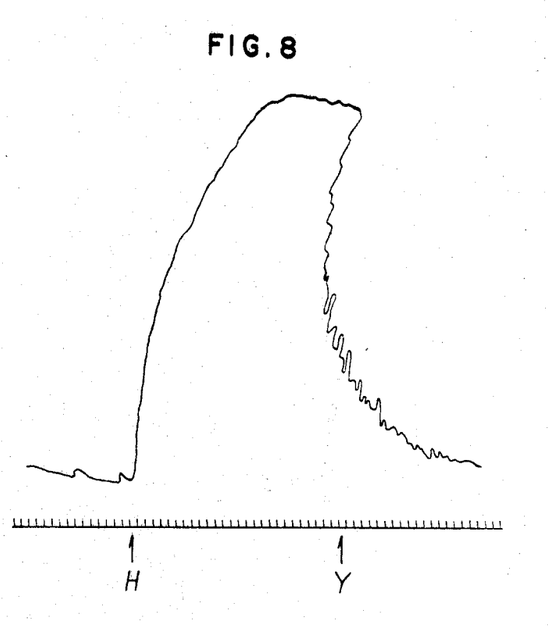
FIG. 8 is a tracing showing the effects of adding a histamine solution to the bath, then adding the tooth paste of this invention.

In the test represented by the graph in FIG. 8, it is proved that after adding a 0.01% histamine solution at point H to the solution containing the intestine section, normal contraction is observed, then when 1 gm. of the tooth paste according to this invention is added at point Y, the intestine section relaxes and returns to the condition prior to the addition of the histamine. This demonstrates that the new tooth paste is free from irritating action.

Figure 9:
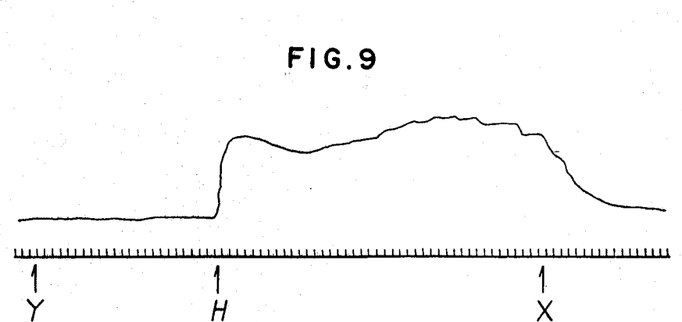
FIG. 9 is a tracing showing the effect of adding the tooth paste of this invention followed by the addition of a histamine and then by the addition of 4,5-diphenylimidazole.

The graph in FIG. 9 shows no contraction of the intestine section even after the addition of 0.5 gm. of the tooth paste of this invention containing 0.2% (I) diluted with 1 cc. of Tyrode's solution at point Y. This proves that the new tooth paste has no irritating action on the mucous membrane. Upon the addition of 1 cc. of 0.01% histamine solution at point H, normal contraction does not occur. The slight, rather than normal contraction was due to the antagonistic function of the new tooth paste toward contraction. When 2 cc. of 0.1% (I) solution was added, the intestine section relaxed and returned to the condition prior to contraction. This test proves that the new tooth paste not only failed to cause irritation, but checked irritation caused by other ingredients.

Figure 10:
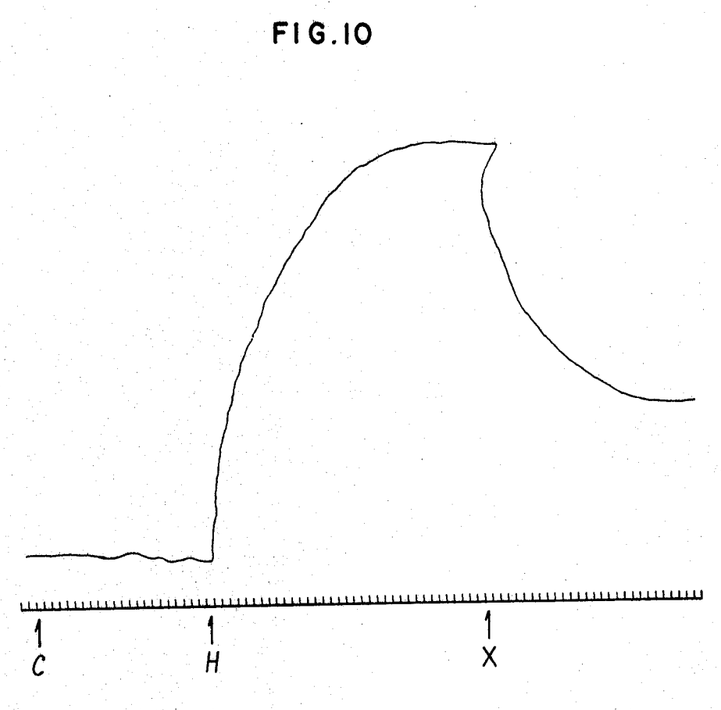
FIG. 10 is a tracing showing the effect when one gram of the tooth paste of this invention is used followed by the use of a histamine solution and then by a solution of 4,5-diphenylimidazole.

The graph in FIG. 10 shows an obvious contraction of the intestine section at point C, when 1 gm. of the tooth paste of this invention, with (I) removed, and diluted with 2 cc. of Tyrode's solution was added, but upon the addition at point H of 1 cc. of a 0.01% histamine solution a normal contract occurred. Upon the addition of 2 cc. of 0.1% (I) at point X, the intestine section extended by about half its former length. The fact that the remaining half did not extend, is thought to be irritating effect of the addition of 1 gm. of tooth paste as at point C.

The graphs of FIGS. 7 and 10 prove pharmacologically that the commercially available tooth paste without (I) and the tooth paste of this invention with (I) removed from it have irritating effects.

From the results of the tests as shown in FIGS. 8 and 9, it is clear that the new tooth paste that contains (I) had the effect of resisting or nullifying the effect of histamine reacting and that it could check any irritating effect on the oral cavity produced by materials comprising conventional dentifrices, and which at the present stage of development cannot be avoided. In the same manner (II), which has a very similar phamacological action can likewise check the irritating action in the oral cavity of the basic material of tooth paste. Either (I) or (II) when added to tooth paste according to this invention displays an antagonistic or nullifying action against the irritating effects of the components of tooth paste on the mucous membrane of the mouth quicker than other ingredients. In other words, they act or react before the unfavorable effects take place, and in consequence there does not occur any unpleasant feeling, chapping of the mucous membrane nor any reaction in the mouth. Furthermore, it enables sensitive users to avoid allergic or other reactions that otherwise might be caused by ingredients of tooth paste.

In addition to their histamine-antagonistic effect, (I) and (II) have the effect of dilating the capillary blood vessels and therefore they promote circulation of blood around the oral cavity and aid in keeping tissues and teeth healthy. The histamine-antagonistic function and dilating function of capillary blood vessel of (I) and (II) form the anti-phlogistic action of them. Their histamine-antagonistic function clinically and pharmacologically differs from anti-histaminic function of the former anti-histaminica.

The preferred quantity of (I) or (II) to be added to tooth paste may be from 0.03 to 1.5% by weight. When it is less than 0.03%, no practical effect can be expected, and when it exceeds 1.5% there results certain incompatability between the ingredients.

In the following examples of the present dentifrice the proportions of the constituents are given by weight:

EXAMPLE V

| | Percent |
|---|---|
| Calcium carbonate | 35.0 |
| Sodium carboxy methyl cellulose | 1.0 |
| Glycerine | 30.0 |
| (I) | 0.2 |
| Sodium N-lauroyl sarcosinate | 0.3 |
| Sodium lauryl sulphate | 0.7 |
| Soluble saccharin | 0.08 |
| Perfume | 0.8 |
| Distilled water | 31.92 |
| Dye | Some |

The ingredients are made up as follows:

(1) (a) (I) is dissolved in a small amount of alcohol; glycerine is then added to it. (b) The alcohol is driven from the above mixture so that (I) remains in solution. The other ingredients are ground thoroughly. (c) Sodium carboxy methyl cellulose is mixed into the above substance.

(2) Soluble saccharin, sodium lauryl sulphate, sodium N-lauroyl sarcosinate are dissolved in distilled water.

(3) 1 and 2 are then added. The dye and calcium carbonate are then mixed and well stirred until the final consistency of the paste is creamy.

EXAMPLE VI

| | Percent |
|---|---|
| Calcium carbonate | 55.0 |
| Sodium carboxy methyl cellulose | 1.0 |
| Glycerine | 15.0 |
| (I) | 0.2 |
| Sodium N-lauroyl sarcosinate | 0.3 |
| Sodium lauryl sulphate | 0.7 |
| Soluble saccharin | 0.1 |
| Perfume | 0.8 |
| Distilled water | 26.9 |
| Dye | Some |

The ingredients are mixed according to Example V to make soft tooth paste.

EXAMPLE VII

| | Percent |
|---|---|
| Calcium carbonate | 89.5 |
| Magnesium carbonate | 8.0 |
| Sodium lauryl sulphate | 1.0 |
| Soluble saccharin | 0.1 |
| Perfume | 1.0 |
| (II) | 0.4 |
| Dye | Some |

Process

Calcium carbonate, magnesium carbonate and lauryl sodium sulphate are mixed thoroughly while stirring, soluble saccharin is added and perfume, dye and (II) (dissolved in a small quantity of alcohol) are added to the first mixture, and mixed well to make powdered dentifrice.

The mention of "some" dye indicates that dye may be used as desired.

It is evident through above mentioned embodiments of this invention that the invention provides the tooth paste, soft tooth paste and tooth powder with unusual properties, in accordance with the objects of the invention.

I claim:

1. An anti-phlogistic and anti-hestaminic composition comprising a major portion of an unctuous cosmetic carrier and an amount of 1-hydroxyethyl-4,5-diphenylimidazole ranging from 0.03% to 1.5%.

2. The preparation of claim 1 wherein the cosmetic carrier is a cold cream.

3. The preparation of claim 1 wherein the cosmetic carrier is a vanishing cream.

References Cited

FOREIGN PATENTS 13,226  8/1961  Japan.

ALBERT T. MEYERS, Primary Examiner

A. P. FAGELSON, Assistant Examiner

U.S. Cl. X.R.

424—49